Feb. 24, 1953  A. E. SCHENEWOLF  2,629,305
COUPLING FOR UNITING A FARMING IMPLEMENT
TO A TRACTION VEHICLE
Filed Oct. 27, 1948  4 Sheets-Sheet 1

Alfred E. Schenewolf
INVENTOR.

BY Clarence A. O'Brien
and Harvey B. Jacobson
Attorneys

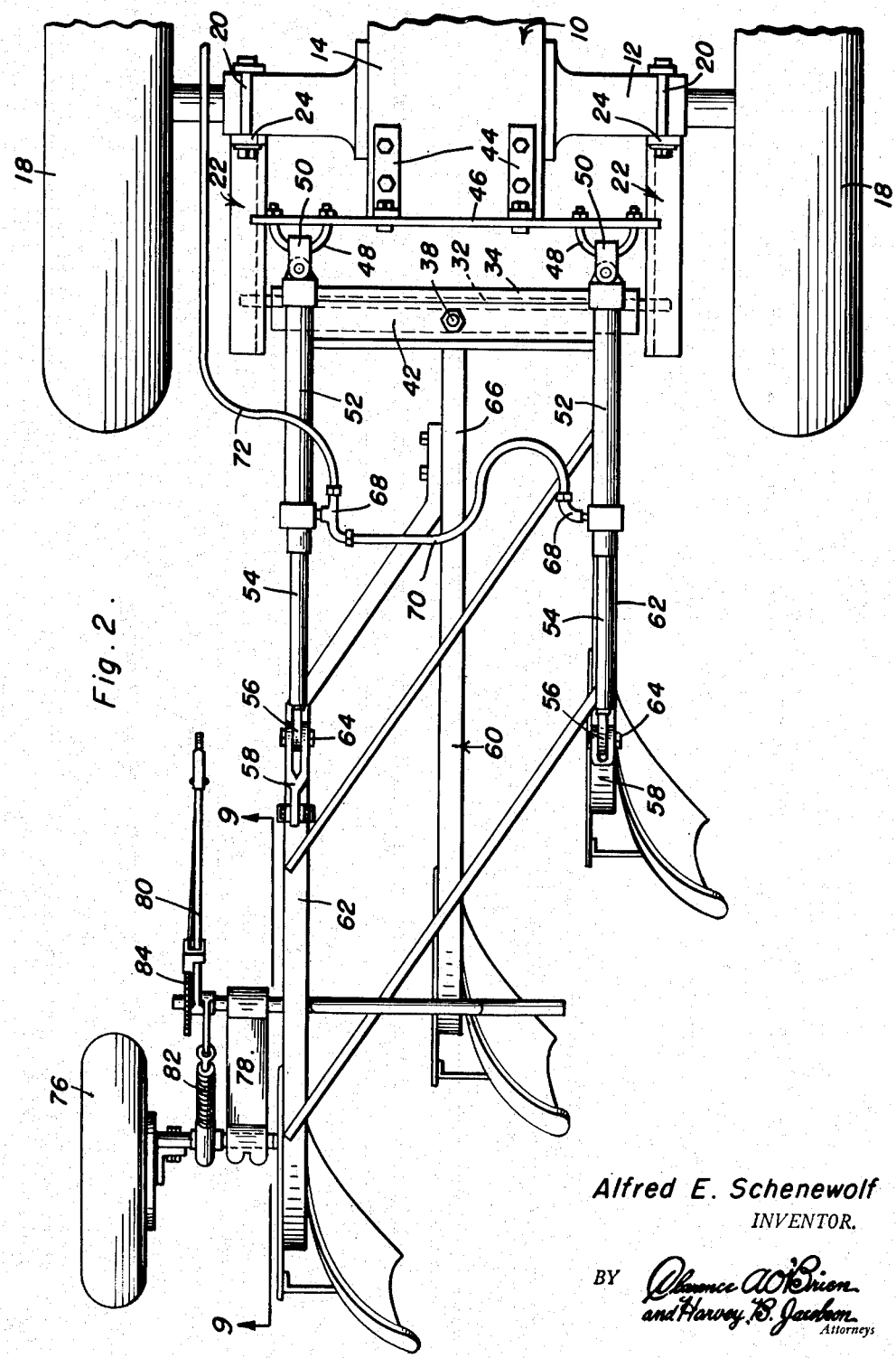

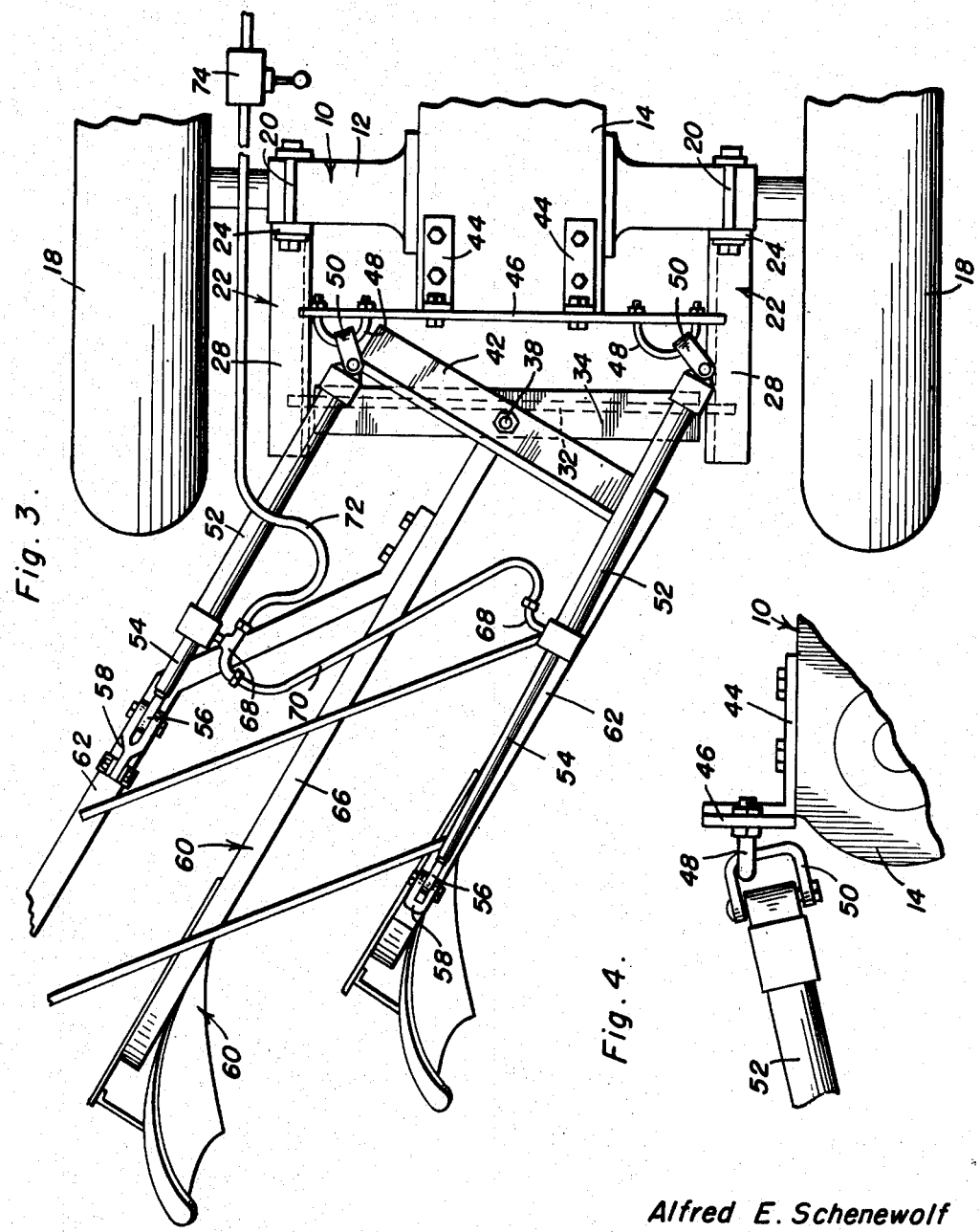

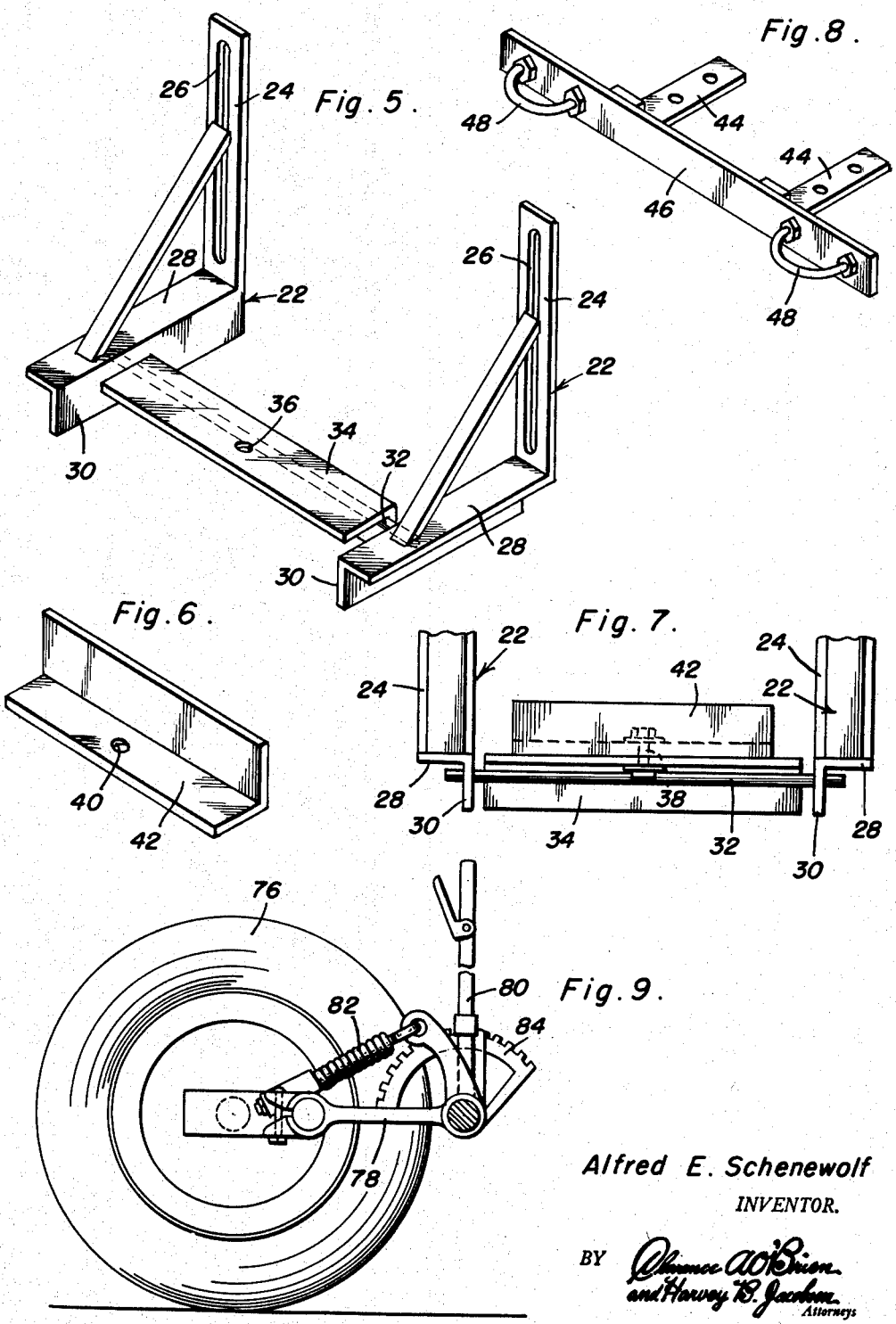

Patented Feb. 24, 1953

2,629,305

UNITED STATES PATENT OFFICE 2,629,305

COUPLING FOR UNITING A FARMING IMPLEMENT TO A TRACTION VEHICLE

Alfred E. Schenewolf, Clinton, Okla.

Application October 27, 1948, Serial No. 56,826

1 Claim. (Cl. 97—50)

This invention relates to a coupling for uniting a farming implement to a traction vehicle and has for its primary object to enable the farming implement to follow the natural contour of the earth during its advance.

Another object is to enable the farming implement to be elevated or lowered during its advance.

Still another object is to enable the farming implement to be elevated out of contact with the ground for transportation as in moving from one field to another.

A still further object is to allow for universal movement of the farming implement relative to the traction vehicle as it is being advanced thereby.

The above and other objects may be attained by employing this invention which embodies among its features a draw bar pivoted intermediate its ends to a traction vehicle to swing in a horizontal arc, means at each end of the draw bar to couple a farming implement thereto, extensible members each connected at one end to the traction vehicle above an end of the draw bar and at its opposite end to an adjacent side of the implement and a means to regulate the length of the extensible members.

Other features include a bracket bolted to a traction vehicle, a rocking bar pivoted to the bracket to swing about a horizontal axis, a draw bar pivoted to the rocking bar intermediate its ends to swing about an axis which lies perpendicular to the axis about which the rocking bar rocks, means coupling opposite ends of the draw bar to a farm implement, a cross bar fixed to the tractor above the draw bar, extensible members, each connected at one end to the cross bar adjacent an end thereof, means coupling the opposite ends of the extensible members to the farming implement adjacent each side thereof, and means to regulate the extension and contraction of the extensible members.

In the drawings:

Figure 1 is a fragmentary perspective view of a tractor showing a farming implement coupled thereto by the use of this improved coupling, Figure 2 is a top plan view of the equipment illustrated in Figure 1, Figure 3 is a view similar to Figure 2 showing the parts in a different position, Figure 4 is an enlarged fragmentary end view of the cross bar illustrating the coupling of an extensible member thereto, Figure 5 is a perspective view of the rocking bar supporting bracket, Figure 6 is a perspective view of the draw bar, Figure 7 is a fragmentary end view of the bracket showing the draw bar thereon.

Figure 8 is a perspective view of the cross bar, and

Figure 9 is a sectional view taken substantially along the line 9—9 of Figure 2.

Figure 1:
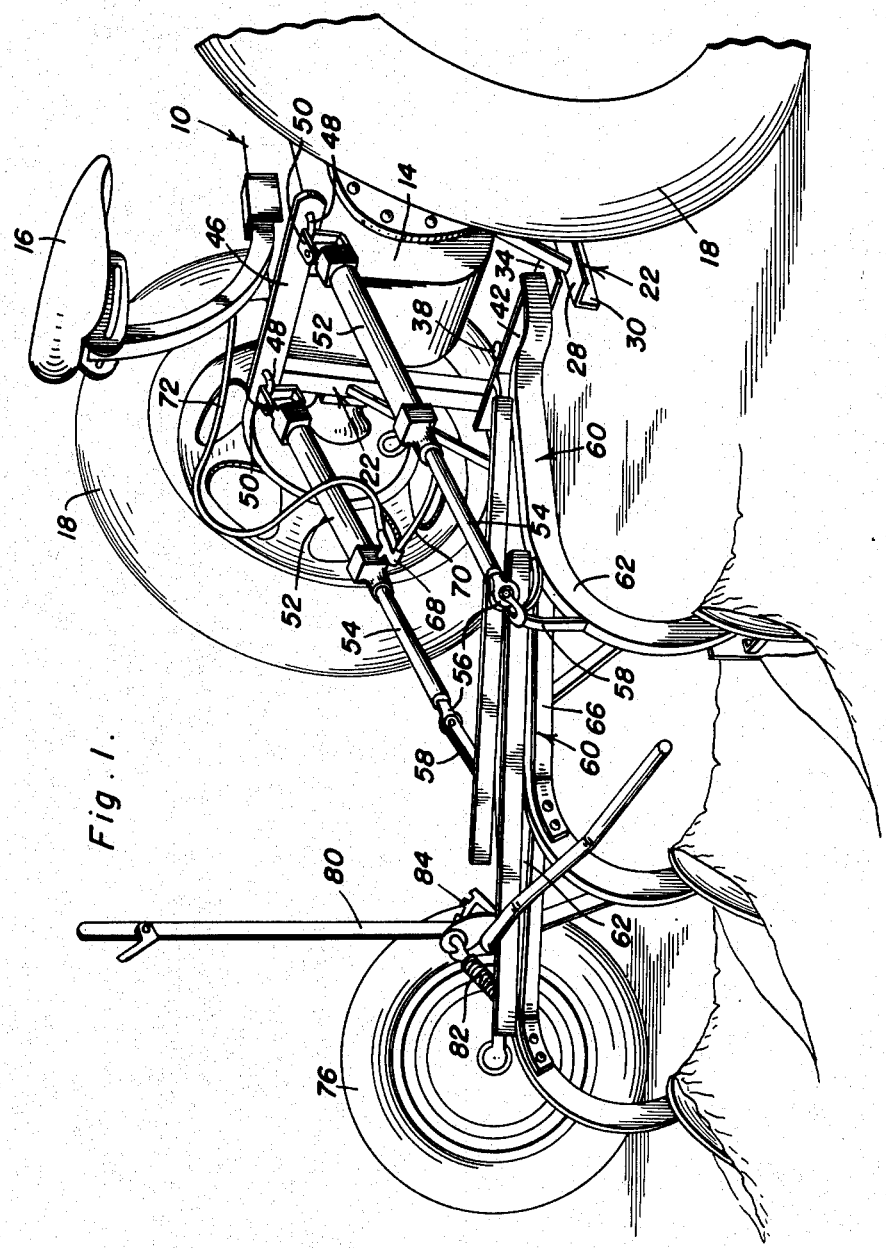

Referring to the drawings in detail a farm tractor designated generally 10 is equipped with a conventional rear axle 12 and gear box 14 which in the ordinary manner constitutes a part of the frame of the tractor. A conventional driver's seat 16 is supported in any suitable manner on the tractor above the gear box, and the rear axle is equipped at opposite ends with conventional traction wheels 18.

Coupled as by U-bolts 20 to the axle 12 is a pair of substantially L-shaped bracket arms 22, the vertical legs 24 of which are provided with elongated longitudinal slots 26 through which the threaded ends of the U-bolts 20 project. Extending horizontally from the lower ends of the vertical legs 24 of the L-shaped brackets 22 are horizontal legs 28 having depending flanges 30 which are provided adjacent their ends remote from the vertical legs 24 with aligned openings for the reception of a pivot shaft 32 which is welded or otherwise rigidly secured to a rocking bar 34 which is formed intermediate its ends with an opening 36, the purpose of which will be more fully hereinafter described.

Extending through the opening 36 in the rocking bar 34 is a pivot bolt 38 which projects through an opening 40 formed substantially midway between opposite ends of a draw bar 42.

Bolted or otherwise rigidly fixed as by bracket arms 44 to the gear box 14 of the traction vehicle 10 above the level of the brackets 22 is a cross bar 46, opposite ends of which are provided with U-bolts 48.

Coupled as by a loop 50 to each U-bolt 48 is one end of a cylinder 52 containing a conventional piston carrying a conventional piston rod 54 which works through the end of the cylinder 52 remote from the loop 50, and carried by the outer end of each piston rod is an eye 56 which is pivotally connected to a suitable bracket 58 which is bolted or otherwise secured to a farm implement such as a plow designated generally 60. In the form of the device as illustrated in the drawings, the brackets 58 are welded to the beams 62 on opposite sides of the plow 60 and the pivotal coupling between the brackets 58 and the eyes 56 is effected by bolts 64, and the draft beam 66 of the plow 60 is provided adjacent its forward end with an opening for the reception of the pivot bolt 38, pivotally to couple the plow to the traction vehicle 10.

The cylinders 52 are equipped adjacent the ends through which the piston rods 54 operate with inlet ports into which suitable fittings 68 are connected, and these fittings are connected together by a flexible pipe 70 in such a manner that when fluid pressure is introduced into the pipe 70, both cylinders will be filled simultaneously. A fluid pressure line 72 is connected to the cylinders 52 and is coupled through the medium of a suitable control valve 74 with a source of fluid pressure on the traction vehicle 10. The valve 74 is preferably located in a position on the traction vehicle for convenient operation by the occupant of the seat 16.

In some instances a plow 60 may be employed having attached thereto one or more wheels 76 which may be mounted on an arm 78 for pivotal movement about a horizontal axis through the medium of a hand lever 80 coupled by a resilient coupling 82 to the wheel in such a manner that by rocking the hand lever 80 about the horizontal axis and locking it in the desired position through the medium of a conventional hand actuated latch and quadrant 84 the wheel may be held at various different positions to support the depth to which the plow points enter the ground.

In use when it is desired to transport the plow from one field to another, the valve 74 is manipulated to cause the pistons simultaneously to move within the cylinders and cause the piston rods 54 to be drawn inwardly, so as to contract the extensible members represented by the cylinders 52 and the piston rods 54, thus to swing the plow 60 upwardly about the axis of the pivot bar 32. When the plow is to be lowered, the valve is manipulated in such a manner as to drain the cylinders and allow the piston rods 54 to move outwardly with relation to the cylinders 52. The position of the plow relative to the rear end of the traction vehicle may vary as suggested in Figure 3 according to the contour of the ground in which the implement is being used. Obviously the plow may shift to opposite sides of the traction vehicle in response to irregularities in the ground, thus extending one piston rod and contracting the other one. By reason of the swinging of the draw bar 42 about the pivot 38, it will be obvious that the plow may take various angular positions with relation to the traction vehicle within the limits of the extensibility of the pistons and piston rods.

Obviously other farming implements than a plow may be coupled to the pivotally mounted draw bar 42 for swinging movement therewith about the pivot 38, as well as movement in a vertical arc about the axis of the pivot bar 32.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A coupling for uniting a farming implement to a traction vehicle comprising a bracket vertically mounted on the rear end of the vehicle, a rocking bar pivotally supported by the bracket transversely to the longitudinal axis of the vehicle and for rocking movement about a horizontal axis, a drawbar pivoted intermediate its ends to the rocking bar to swing about a vertical axis perpendicular to the axis about which the rocking bar rocks for securing horizontal rocking movement of said drawbar, means for rigidly coupling a farm implement to the drawbar whereby said implement is laterally movable with respect to said vehicle, a cross bar secured to the vehicle above and parallel with the rocking bar, hydraulic cylinders coupled at one end to the cross bar for universal movement, piston rods working in said cylinders remote from the vehicle, means pivotally coupling the extending ends of each piston rod to the farming implement, a fluid pressure line connected to said cylinders, a control valve in said line and remotely positioned with respect to said cylinders for controlling the flow of fluid into and out of the cylinders and thereby regulating the vertical angular movement of the implement on the rocking bar.

ALFRED E. SCHENEWOLF.

REFERENCES CITED

The following references are of record in the file of this patent:

UNITED STATES PATENTS

| Number | Name | Date |
|---|---|---|
| 988,813 | Procknow | Apr. 4, 1911 |
| 1,113,431 | Groupe | Oct. 13, 1914 |
| 1,603,993 | Stark | Oct. 19, 1926 |
| 2,110,186 | Weimer | Mar. 8, 1938 |
| 2,242,826 | Keeler | May 20, 1941 |
| 2,281,224 | Baumgartner | Apr. 28, 1942 |
| 2,287,479 | Kelsey | June 23, 1942 |
| 2,403,360 | Graham | July 2, 1946 |